US012771148B2

(12) United States Patent
Kim

(10) Patent No.: US 12,771,148 B2
(45) Date of Patent: Oct. 20, 2026

(54) CHARGE/DISCHARGE POWER CONTROL DEVICE, ENERGY STORAGE SYSTEM, AND OPERATION METHOD OF ENERGY STORAGE SYSTEM

(71) Applicant: LG ENERGY SOLUTION, LTD., Seoul (KR)

(72) Inventor: Jongcheol Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 848 days.

(21) Appl. No.: 18/027,214

(22) PCT Filed: Aug. 16, 2022

(86) PCT No.: PCT/KR2022/012156
§ 371 (c)(1),
(2) Date: Mar. 20, 2023

(87) PCT Pub. No.: WO2023/022456
PCT Pub. Date: Feb. 23, 2023

(65) Prior Publication Data
US 2023/0378768 A1 Nov. 23, 2023

(30) Foreign Application Priority Data
Aug. 20, 2021 (KR) ........................ 10-2021-0110085

(51) Int. Cl.
*H02J 7/50* (2026.01)
*H02J 7/34* (2006.01)

(52) U.S. Cl.
CPC ................. *H02J 7/50* (2026.01); *H02J 7/345* (2013.01); *H02J 2207/20* (2020.01)

(58) Field of Classification Search
CPC .................................... H02J 7/50; H02J 7/345
See application file for complete search history.

(56) References Cited

U.S. PATENT DOCUMENTS 10,361,567 B2 7/2019 Jhunjhunwala et al.
2005/0105226 A1 5/2005 Bedard et al.
(Continued)

FOREIGN PATENT DOCUMENTS

CN 103023156 A 4/2013
CN 108569154 A 9/2018
(Continued)

OTHER PUBLICATIONS

Korean Office Action for Korean Af cation No. 10-2021-0110085, dated May 16, 2025, with English translation.
(Continued)

*Primary Examiner* — Robert Grant
(74) *Attorney, Agent, or Firm* — Birch, Stewart, Kolasch & Birch, LLP

(57) ABSTRACT

An apparatus for controlling charge and discharge power in an energy storage system including a plurality of battery racks may comprise a first direct current/direct current (DC/DC) converter selectively connected to one of the plurality of battery racks to perform power conversion; a second DC/DC converter connected to the first DC/DC converter; and a controller for controlling the second DC/DC converter to perform an operation of maintaining the output of the first DC/DC converter while a switching between battery racks by the first DC/DC converter is being performed.

20 Claims, 11 Drawing Sheets

(56) References Cited

U.S. PATENT DOCUMENTS

| | | | | |
|---|---|---|---|---|
| 2012/0043819 | A1 | 2/2012 | Kang et al. | |
| 2013/0069429 | A1 | 3/2013 | Yang et al. | |
| 2015/0002095 | A1 | 1/2015 | Wada et al. | |
| 2018/0257494 | A1 | 9/2018 | Yang et al. | |
| 2021/0343993 | A1* | 11/2021 | Yang .................. | H01M 10/425 |

FOREIGN PATENT DOCUMENTS

| | | | |
|---|---|---|---|
| JP | 3232741 | B2 | 11/2001 |
| JP | 2005-27374 | A | 1/2005 |
| JP | 2009-33936 | A | 2/2009 |
| JP | 2015-159631 | A | 9/2015 |
| KR | 10-1021265 | B1 | 3/2011 |
| KR | 10-2012-0017930 | A | 2/2012 |
| KR | 10-1167795 | B1 | 7/2012 |
| KR | 10-2014-0127858 | A | 11/2014 |
| KR | 10-2016-0022102 | A | 2/2016 |
| KR | 10-1599959 | B1 | 3/2016 |
| KR | 10-1599962 | B1 | 3/2016 |
| KR | 10-2016-0078013 | A | 7/2016 |
| KR | 10-2016-0132633 | A | 11/2016 |
| KR | 10-2018-0050156 | A | 5/2018 |
| KR | 10-2063692 | B1 | 1/2020 |
| KR | 10-2100104 | B1 | 4/2020 |
| KR | 10-2198040 | B1 | 1/2021 |
| KR | 10-2236346 | B1 | 4/2021 |
| WO | WO00/021178 | A1 | 4/2000 |
| WO | WO2020/244758 | A1 | 12/2020 |

OTHER PUBLICATIONS

European Search Report for European Application No. 22858693.9, dated Apr. 12, 2024.

International Search Report (PCT/ISA/210) issued in PCT/KR2022/012156, dated Nov. 30, 2022.

Chinese Office Action and Search Report for Chinese Application No. 202280006780.3, dated Jun. 12, 2026, with English translation.

* cited by examiner

[Figure 1]
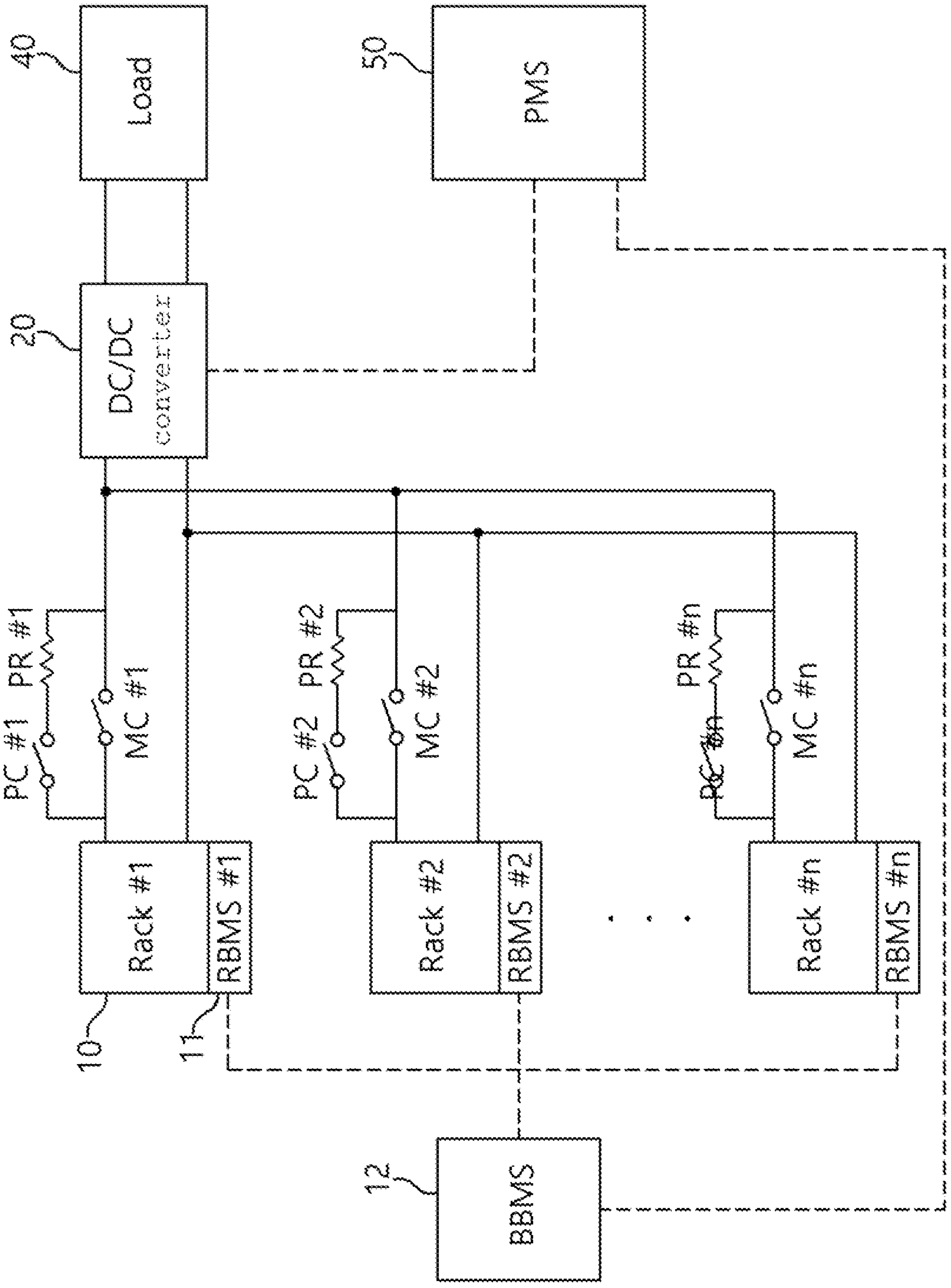

[Figure 2A]
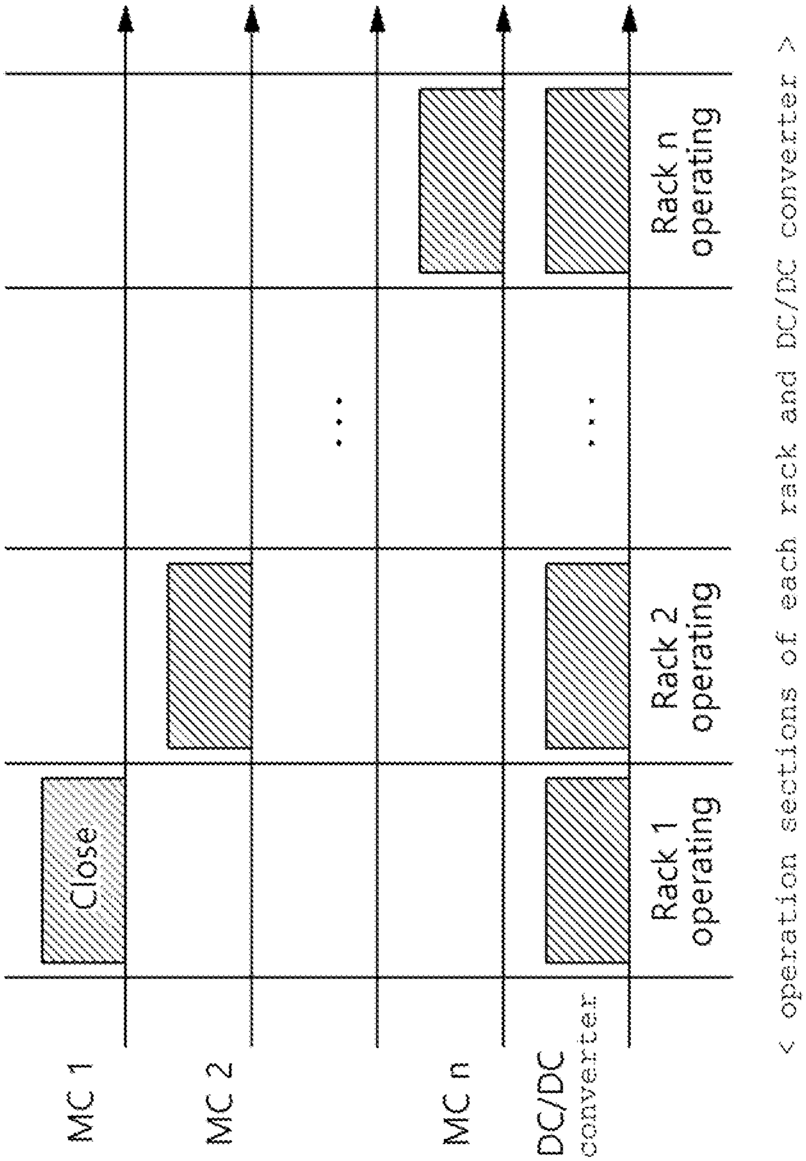

[Figure 2B]
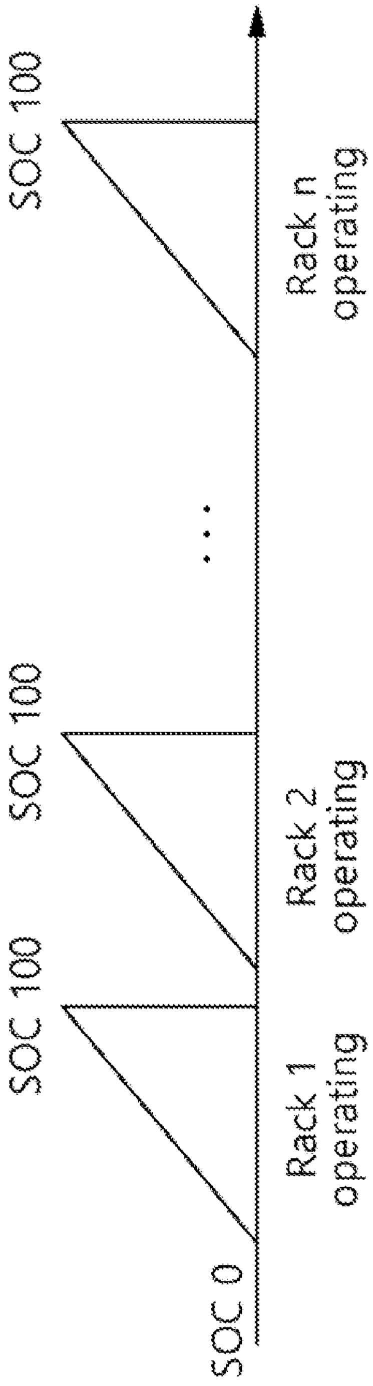

[Figure 2C]
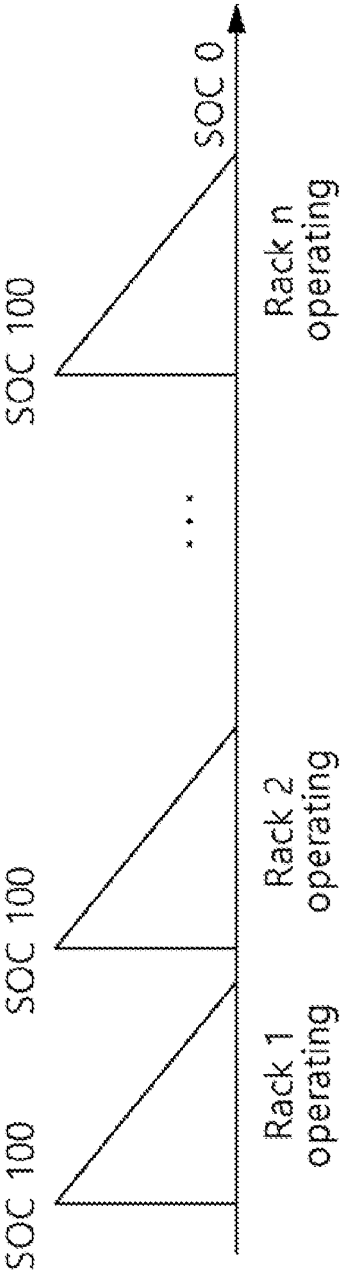

[Figure 3]
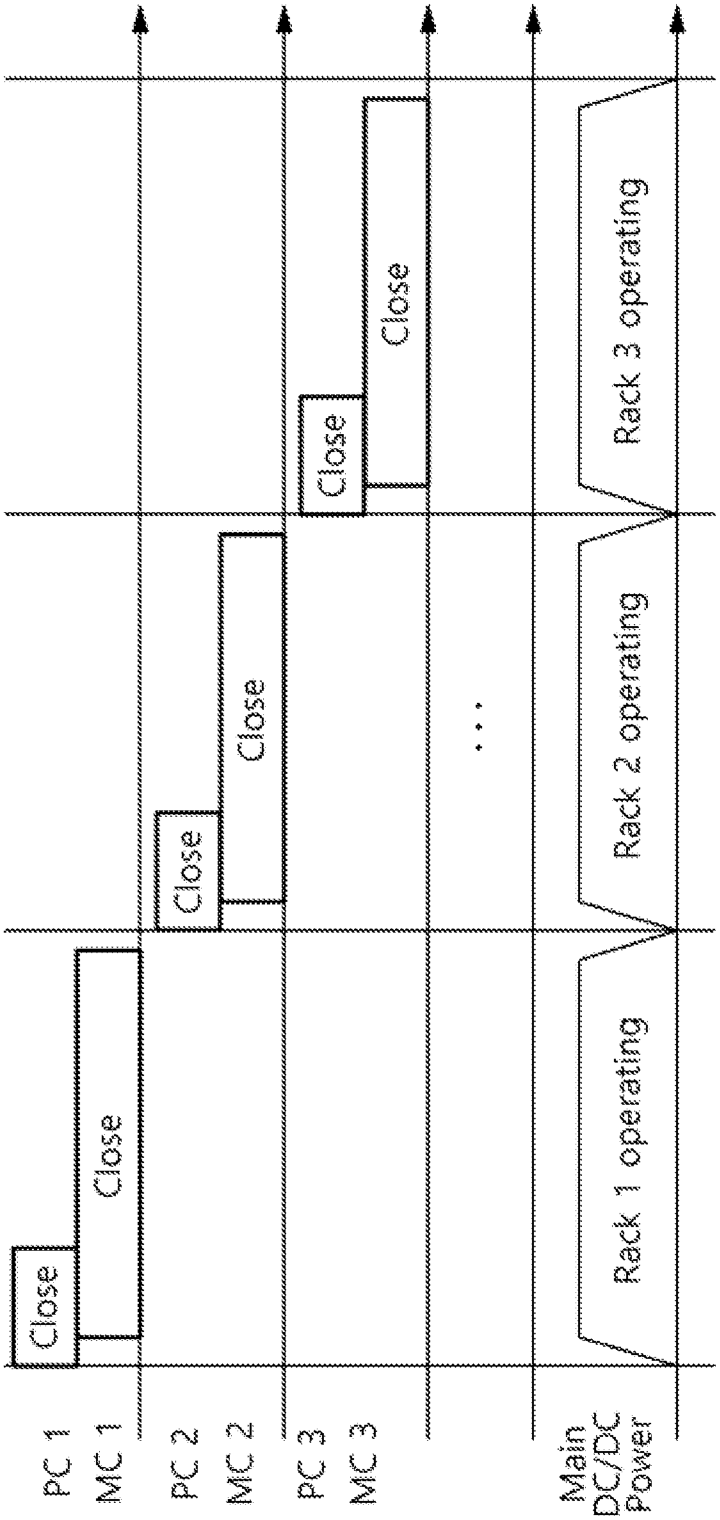

[Figure 4]
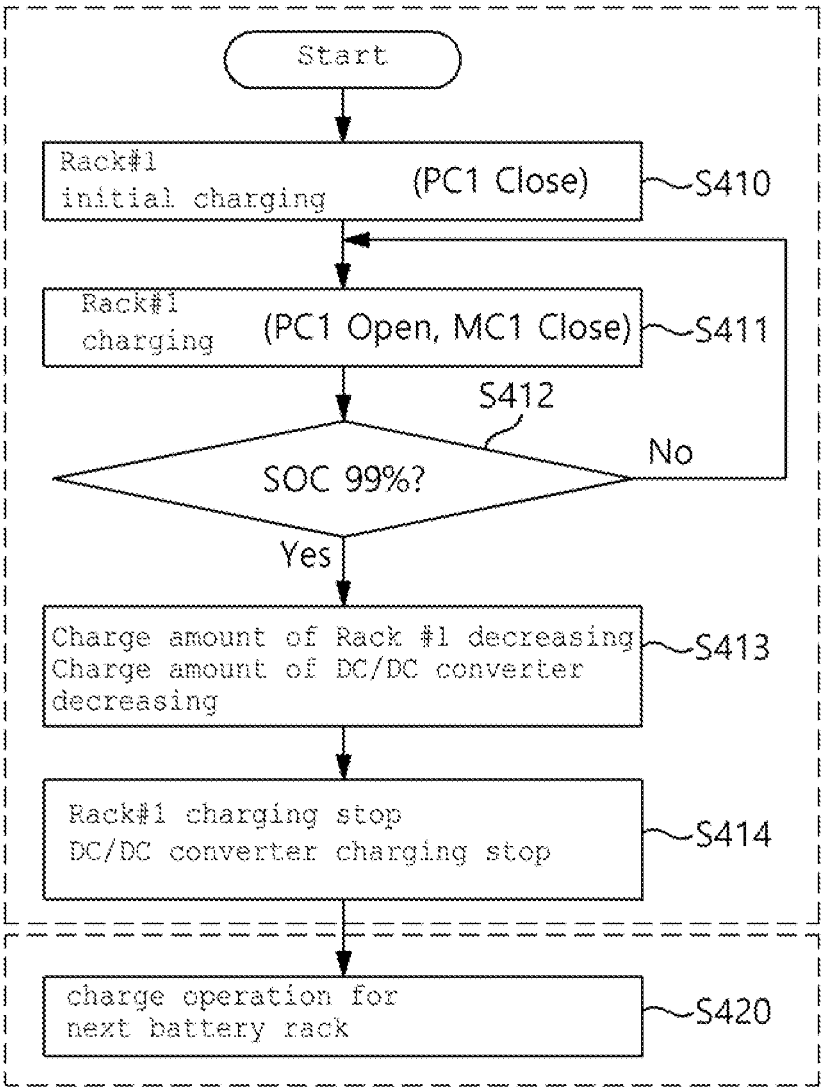

[Figure 5]
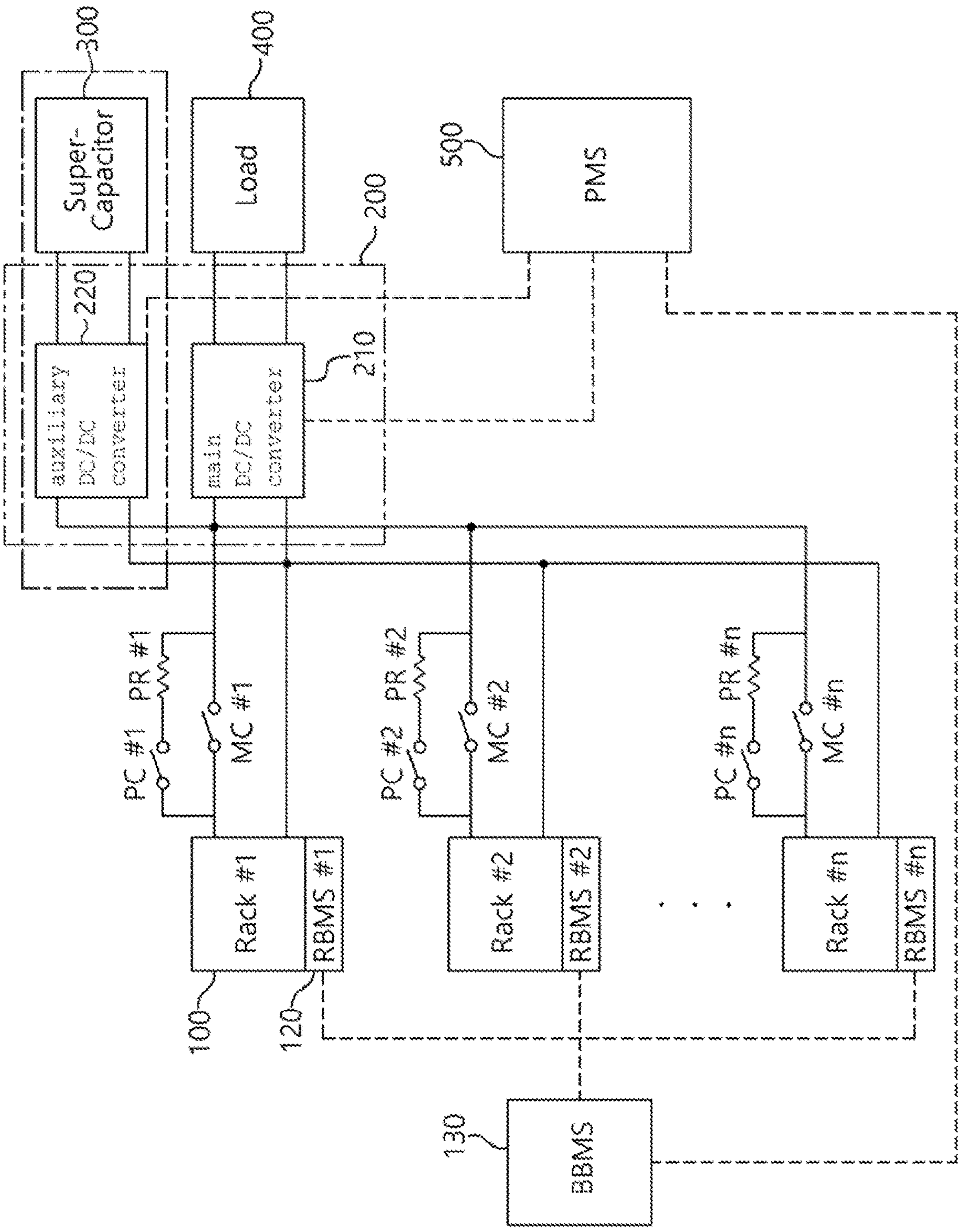

[Figure 6]
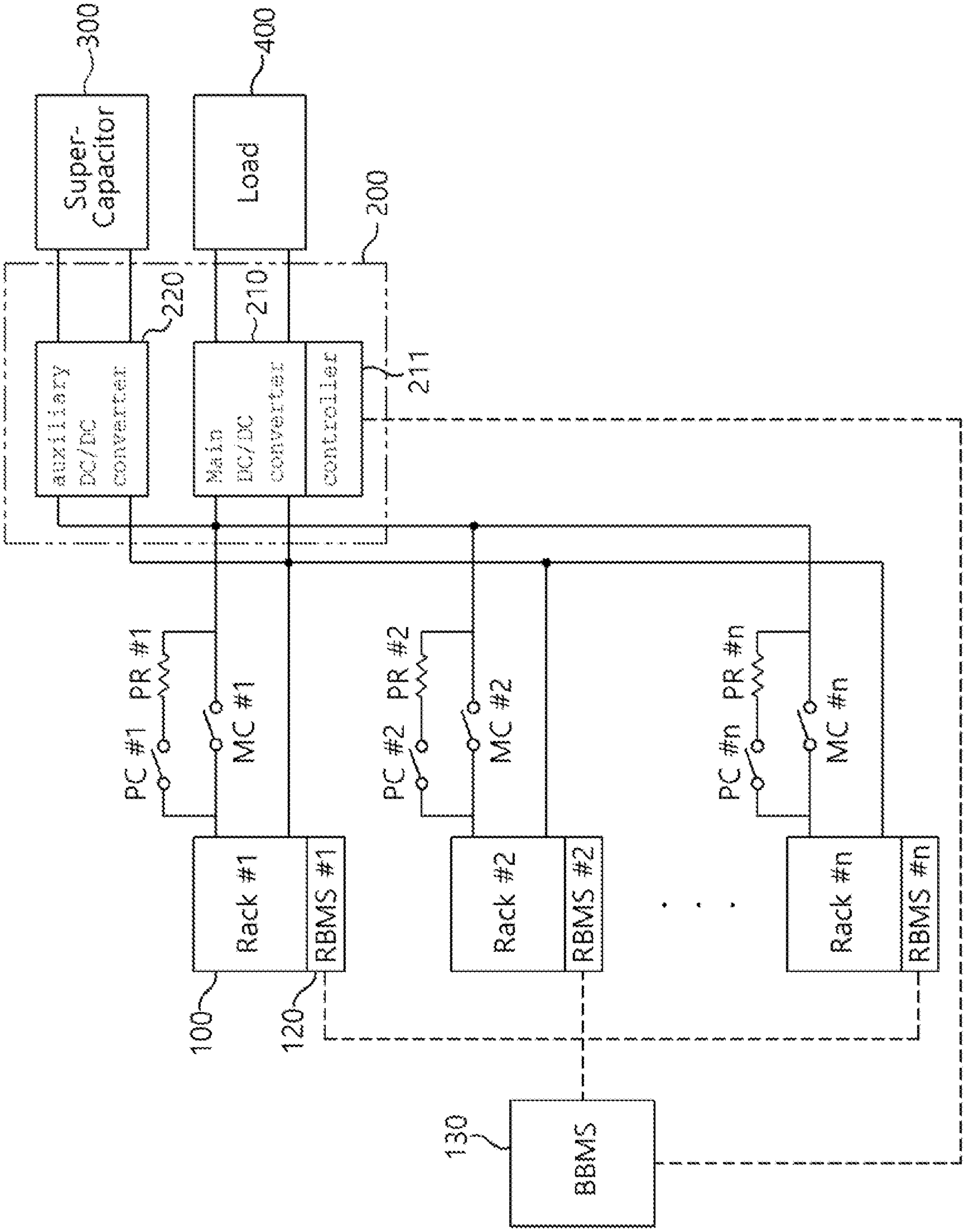

[Figure 7]
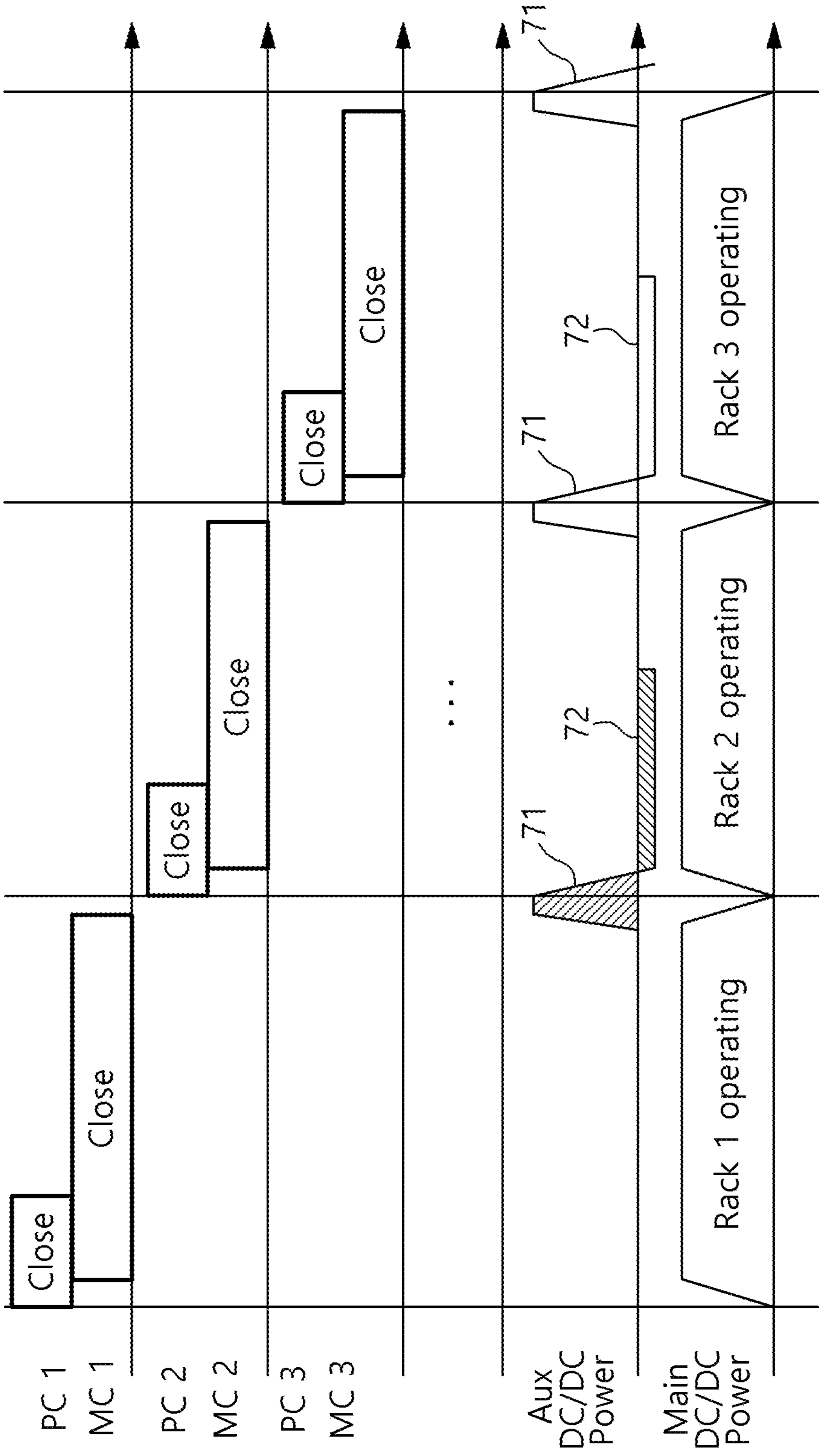

[Figure 8]
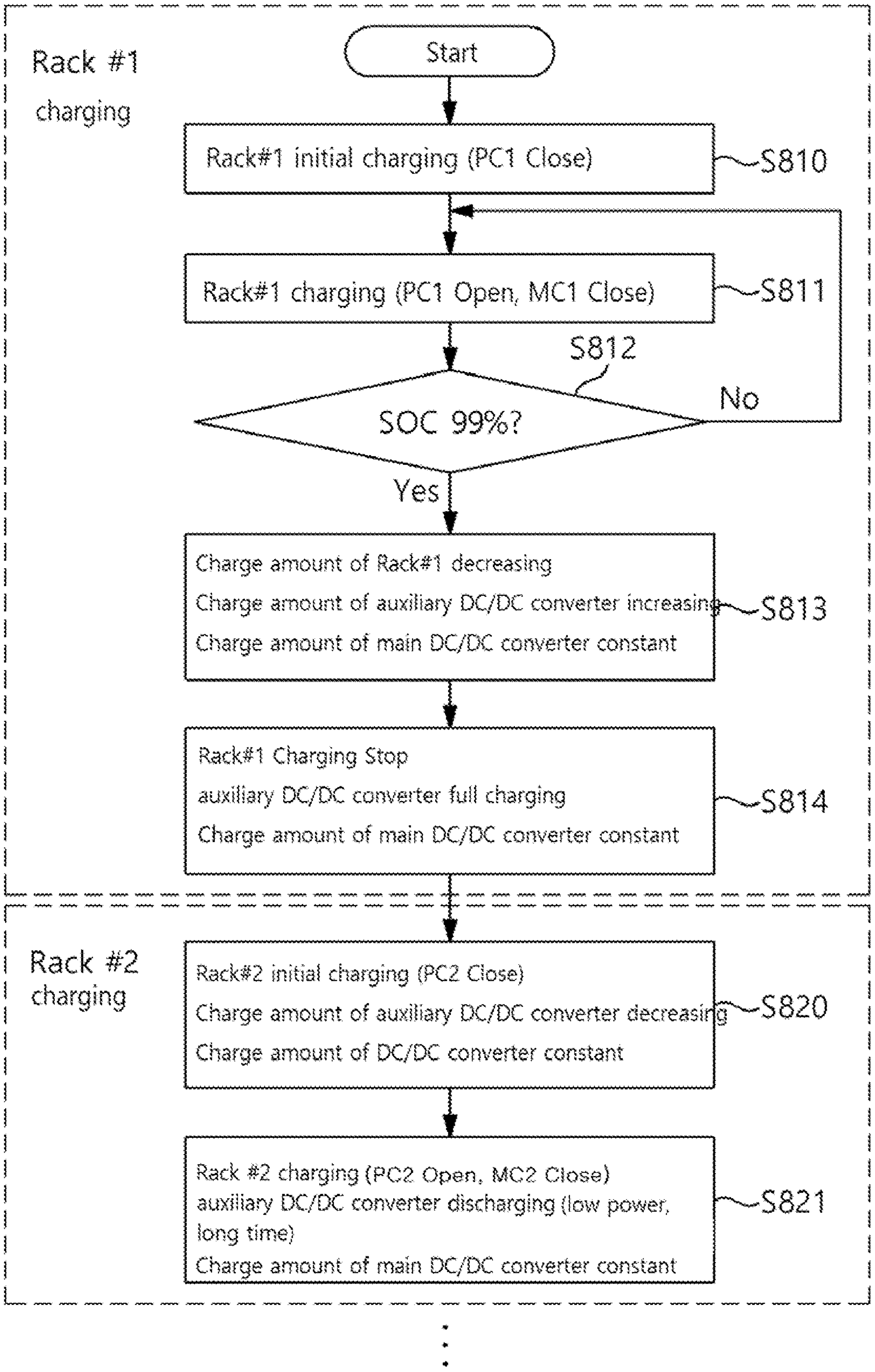

[Figure 9]
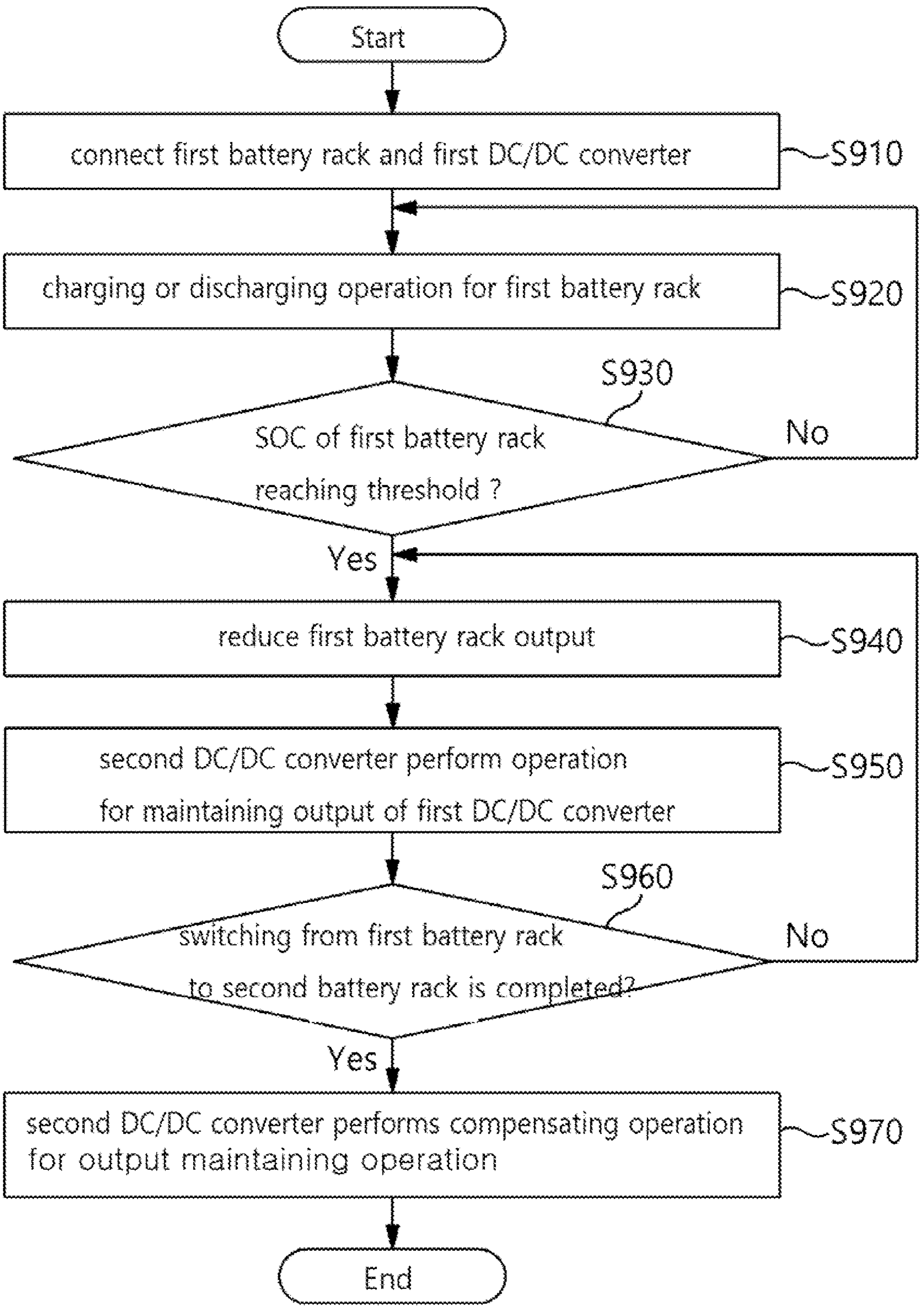

CHARGE/DISCHARGE POWER CONTROL DEVICE, ENERGY STORAGE SYSTEM, AND OPERATION METHOD OF ENERGY STORAGE SYSTEM

TECHNICAL FIELD

This application claims priority to and the benefit of Korean Patent Application No. 10-2021-0110085 filed in the Korean Intellectual Property Office on Aug. 20, 2021, the entire contents of which are incorporated herein by reference.

The present invention relates to an apparatus for controlling charge and discharge power, an energy storage system, and a method of operating an energy storage system, and more particularly, to an apparatus for controlling charge and discharge power using a main DC/DC converter and an auxiliary DC/DC converter, an energy storage system, and a method of operating an energy storage system.

BACKGROUND ART

An energy storage system relates to renewable energy, a battery that stores electric power, and grid power. Recently, as the spread of smart grid and renewable energy is expanding and the efficiency and the stability of the power system are emphasized, a demand for energy storage systems for power supply and demand control and power quality improvement is increasing. Depending on a purpose of use, energy storage systems may have different outputs and capacities. In order to configure a large-capacity energy storage system, a plurality of battery systems may be connected.

In the energy storage system, the battery needs to be linked with a power converter (direct current/direct current (DC/DC) converter) in order to charge/discharge the battery. In particular, in order to construct an energy storage system using multiple battery racks or using battery racks retrieved from vehicles, a power converter must be connected to each battery.

However, providing a power conversion device for each rack in a system including a plurality of battery racks may become a costly burden. Especially, since the energy storage system is used for providing energy over a considerable period of time, it is necessary to optimize a design of the system in consideration of this.

DETAILED DESCRIPTION OF THE INVENTION

Technical Problem

Embodiments of the present disclosure provide an apparatus for controlling charge and discharge power in an energy storage system.

Embodiments of the present disclosure also provide an energy storage system including the apparatus for controlling charge and discharge power.

Embodiments of the present disclosure also provide a method of operating an energy storage system.

Technical Solution

In order to achieve the objective of the present disclosure, an apparatus for controlling charge and discharge power in an energy storage system including a plurality of battery racks may comprise a first direct current/direct current (DC/DC) converter selectively connected to one of the plurality of battery racks to perform power conversion; a second DC/DC converter connected to the first DC/DC converter; and a controller configured to control the second DC/DC converter to perform an operation of maintaining an output of the first DC/DC converter while a switching between battery racks by the first DC/DC converter is being performed.

The controller may further be configured to control the second DC/DC converter to perform a compensating operation for the operation of maintaining the output of the first DC/DC converter after the switching between battery racks by the first DC/DC converter is completed.

The apparatus for controlling charge and discharge power may further comprise an energy storage device connected to the second DC/DC converter. The energy storage device may include at least one of a capacitor, a super capacitor, and a battery.

The operation of maintaining the output of the first DC/DC converter may be a discharge operation or a charge operation.

The controller may be a power management system (PMS) or an internal controller included in the first DC/DC converter.

Upon the operation of maintaining the output of the first DC/DC converter being discharging, the compensating operation may be a low power charging operation to the energy storage device.

Furthermore, upon the operation of maintaining the output of the first DC/DC converter being charging, the compensating operation may be a low power discharging operation to the energy storage device.

According to another embodiment of the present disclosure, an energy storage system may comprise a plurality of battery racks; a plurality of switches individually connected to each battery rack; a first direct current/direct current (DC/DC) converter selectively connected to one of the plurality of battery racks through the plurality of switches; a second DC/DC converter connected to the plurality of switches and the first DC/DC converter; and a controller configured to control the second DC/DC converter to perform an operation of maintaining an output of the first DC/DC converter while a switching between battery racks by the first DC/DC converter is being performed.

The controller may further be configured to control the second DC/DC converter to perform a compensating operation for the operation of maintaining the output of the first DC/DC converter after the switching between battery racks by the first DC/DC converter is completed.

The energy storage system may further comprise an energy storage device connected to the second DC/DC converter.

Upon the operation of maintaining the output of the first DC/DC converter being discharging, the compensating operation may be a low power charging operation to the energy storage device.

Furthermore, upon the operation of maintaining the output of the first DC/DC converter being charging, the compensating operation may be a low power discharging operation to the energy storage device.

According to another embodiment of the present disclosure, a method of operating an energy storage system, which includes a plurality of battery racks, a first direct current/direct current (DC/DC) converter selectively connected to one of the plurality of battery racks, and a second DC/DC converter, may comprise connecting a first battery rack among the plurality of battery racks and the first DC/DC converter to perform a charge or discharge operation for the first battery rack; upon a state of charge of the first battery rack reaching a threshold which is set in relation to switching between battery racks, reducing an output of the first battery rack; and performing, by the second DC/DC converter, an operation to maintain an output of the first DC/DC converter.

The method of method of operating an energy storage system may further comprise, upon the charging or discharging operation for the first battery rack is completed, connecting the first DC/DC converter to a second battery rack to perform the next charging or discharging operation.

Here, the second DC/DC converter may be connected to a separate energy storage device to perform an operation of maintaining the output of the first DC/DC converter.

The method of method of operating an energy storage system may further comprise performing, by the second DC/DC converter, a compensating operation for the operation of maintaining the output of the first DC/DC converter, after the switching between battery racks by the first DC/DC converter is completed.

Here, upon the operation of maintaining the output of the first DC/DC converter being discharging, the compensating operation may be a low power charging operation to the energy storage device.

Furthermore, upon the operation of maintaining the output of the first DC/DC converter being charging, the compensating operation may be a low power discharging operation to the energy storage device.

Advantageous Effects

According to embodiments of the present disclosure, continuous output of a power conversion device related to charge or discharge is possible while reducing a cost of an energy storage system.

Accordingly, it is possible to improve power quality provided by the energy storage system.

BRIEF DESCRIPTION OF THE DRAWINGS

FIG. 1 is a block diagram of an existing energy storage system in which a plurality of battery racks are connected to one power converter.

FIG. 2A shows operation sections of each element of the existing energy storage system.

FIG. 2B is a graph showing a SOC change for each rack during a charge process in the existing energy storage system.

FIG. 2C is a graph showing a SOC change for each rack during a discharge process in the existing energy storage system.

FIG. 3 is a diagram illustrating operation sequences for respective elements in the existing energy storage system.

FIG. 4 shows an operation example of the existing energy storage system.

FIG. 5 is a block diagram of an energy storage system according to embodiments of the present invention.

FIG. 6 is a block diagram of an energy storage system according to another embodiment of the present invention.

FIG. 7 is a diagram illustrating an operation sequence for each component in the energy storage system according to embodiments of the present invention.

FIG. 8 illustrates an exemplary operation when a charging operation is performed in an energy storage system according to embodiments of the present invention.

FIG. 9 is a flowchart of a method of operating an energy storage system according to embodiments of the present invention.

BEST MODE

The present invention may be modified in various forms and have various embodiments, and specific embodiments thereof are shown by way of example in the drawings and will be described in detail below. It should be understood, however, that there is no intent to limit the present invention to the specific embodiments, but on the contrary, the present invention is to cover all modifications, equivalents, and alternatives falling within the spirit and technical scope of the present invention. Like reference numerals refer to like elements throughout the description of the figures.

It will be understood that, although the terms such as first, second, A, B, and the like may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes combinations of a plurality of associated listed items or any of the plurality of associated listed items.

It will be understood that when an element is referred to as being "coupled" or "connected" to another element, it can be directly coupled or connected to the other element or an intervening element may be present. In contrast, when an element is referred to as being "directly coupled" or "directly connected" to another element, there is no intervening element present.

The terms used herein is for the purpose of describing specific embodiments only and are not intended to limit the present invention. As used herein, the singular forms "a", "an" and "the" are intended to include the plural forms as well, unless the context clearly indicates otherwise. It will be further understood that the terms "comprises", "comprising", "includes", "including" and/or "having", when used herein, specify the presence of stated features, integers, steps, operations, constitutional elements, components and/or combinations thereof, but do not preclude the presence or addition of one or more other features, integers, steps, operations, constitutional elements, components, and/or combinations thereof.

Unless otherwise defined, all terms used herein, including technical and scientific terms, have the same meanings as commonly understood by one skilled in the art to which the present invention belongs. It will be further understood that terms, such as those defined in commonly used dictionaries, should be interpreted as having meanings that are consistent with their meanings in the context of the relevant art and will not be interpreted in an idealized or overly formal sense unless expressly so defined herein.

Hereinafter, exemplary embodiments of the present invention will be described in detail with reference to the accompanying drawings.

FIG. 1 is a block diagram of an existing energy storage system in which a plurality of battery racks are connected to one power converter.

The system shown in FIG. 1 is provided in a form in which a plurality of battery racks (or battery packs) are connected to one power converter in order to overcome a disadvantage which occurs when a respective power converter is installed for each battery rack.

Referring to FIG. 1, in an energy storage system (ESS), a battery is used for storing energy or power. Typically, multiple battery modules may form a battery rack and multiple battery racks (rack #1, rack #2, . . . , rack #N) may form a battery bank. Here, depending on a device or a system in which the battery is used, a battery rack may be referred to as a battery pack.

Here, a rack battery management system (RBMS) 11 may be installed for each battery. The RBMS 11 may monitor a current, a voltage and a temperature of each battery rack (or pack) to be managed, calculate a Status Of Charge (SOC) of the battery based on monitoring results to control charging and discharging. A plurality of RBMSs are connected to a BBMS (Bank BMS) 12, which is a BMS that monitors and controls the entire battery system as an upper controller of the plurality of RBMSs.

A plurality of battery racks (or battery packs) are connected to a power converter (DC/DC converter; 20) through an individual switch unit. In FIG. 1, the switch unit located at an output terminal of each battery rack may include a pre-charge circuit and a main contactor (MC; Main Contactor). A precharge contactor (PC) and a precharge resistor (PR) constitute a pre-charge circuit and perform a role as an initial charging circuit. The main contactor connected in parallel with the pre-charge circuit closes to form a charge/discharge circuit and performs a normal charging/discharging after the initial charging is completed.

An output of the DC/DC converter 20 may be connected to a load 40 and a power management system (PMS) 30. The power management system is the highest level controller that oversees the entire system. The power management system is connected with the BBMS 12, calculates an output command value of the DC/DC converter based on BMS monitoring values, and transmits it to the DC/DC converter. Meanwhile, the load may be a DC load or a PCS, an inverter, or the like. Here, the power conversion system (PCS) is device for performing charge/discharge based on a charge/discharge command, and may be configured to include a power conversion unit (DC/AC inverter) and a controller.

FIG. 2A shows operation sections of each element of the existing energy storage system.

Referring to FIG. 2A, when the power of battery rack #1 is transferred to the DC/DC converter, MC #1 is closed and a charging/discharging operation of battery rack #1 may be performed. When the charging/discharging of battery rack #1 is completed, MC #1 is opened, and thus battery rack #1 is disconnected from the DC/DC converter. Subsequently, MC #2 is closed in order to transfer the power of battery rack #2 to the DC/DC converter, and a charging/discharging operation of battery rack #2 may be performed. In other words, only one battery rack can be connected to the DC/DC converter at the same time.

Here, referring to the operating state of the DC/DC converter shown in the bottom of FIG. 2A, the output of the DC/DC converter is adjusted to "0" whenever a switching from one battery rack to another is made.

FIG. 2B is a graph showing a SOC change for each rack during a charge process in the existing energy storage system.

During a charge operation for battery rack #1, the SOC of battery rack #1 increases in proportion to time and charging is completed after a certain period of time. Thereafter, a charge operation for battery rack #2 initiates and a state of charge (SOC) of battery rack #2 increases. In other words, a next battery rack can start operating only when charging for one battery rack is completed. Here, the state of charge (SOC) represents a current charge state of a battery as a percentage [%].

FIG. 2C is a graph showing a SOC change for each rack during a discharge process in the existing energy storage system.

During a discharge operation for battery rack #1, the SOC of battery rack #1 decreases over time and discharging is completed after a certain period of time. Thereafter, a discharge operation for battery rack #2 initiates and the SOC of battery rack #2 reduces. In other words, a next battery rack can start operating only when discharging for one battery rack is completed.

FIG. 3 is a diagram illustrating operation sequences for respective elements in the existing energy storage system.

Referring to FIG. 3, each battery rack performs a pre-charging operation using a pre-charge circuit to gradually increase the output before operating normally. When the battery reaches a specific voltage through the pre-charge operation, a main switch is closed, and thereafter, a normal charging or discharging operation may be performed.

Here, referring to the operating state of the DC/DC converter shown at the bottom of FIG. 3, the output power of the DC/DC converter is discontinuous. In other words, in the existing energy storage system, the output of the DC/DC converter is momentarily adjusted to "0" at a switching moment of the battery racks and a next battery rack operation may be performed thereafter.

FIG. 4 shows an operation example of the existing energy storage system.

FIG. 4 is an operational flowchart when charging a battery rack in the conventional energy storage system in FIG. 1. In case that charging to battery rack #1 in the system is performed will be described. Charging for battery rack #1 includes an initial charging process (S410) performed with precharge contactor 1 (PC 1) closed, and a normal charging process (S411) performed with precharge contactor 1 open and main contactor 1 closed. The charging process for battery rack #1 continues until the SOC of battery rack #1 reaches a specific threshold (99% in FIG. 4) (S412). Here, the SOC threshold may be described as a reference value for starting to reduce the output of the battery rack in operation for a battery switching, and may be set to a different value according to each system.

Then, when the SOC of battery rack #1 reaches, for example, 99%, the charge amount of battery rack #1 is gradually reduced, and the charge amount of the DC/DC converter also decreases (S413). Thereafter, when the charging operation for battery rack #1 is completed and the charging operation for battery rack #1 is stopped, the charging operation of the DC/DC converter is also stopped and the output becomes temporarily "0" (S414).

Then, switching to the next battery rack (battery rack #2 in FIG. 4) is performed, and for the next battery rack, the same process as the operations in battery rack #1 may be performed (S420).

As such, in a system in which a plurality of battery racks are connected to one DC/DC converter, switching to the next battery rack or battery pack is needed after charging or discharging one battery rack or battery pack. In this instance, it is necessary to adjust the output of the currently running DC/DC converter to zero for switching, which may result in a decrease in power quality provided by the overall system. In addition, as the number of parallel-connected battery racks or battery packs increases, the number of times the output of the DC/DC converter is adjusted to zero increases, and this problem is further exacerbated.

FIG. 5 is a block diagram of an energy storage system according to embodiments of the present invention.

The energy storage system to which the present invention is applied may include a plurality of battery racks 100 (or battery packs) and a rack battery management system (RBMS) 120 may be installed for each battery.

Here, the battery rack 100 may be a battery that is newly arranged for the purpose of being used in the energy storage system. The battery rack may also be composed of a various types of batteries (according to vehicle types) that were used in a vehicle, then retrieved and recycled.

The RBMS 120 may monitor a current, a voltage and a temperature of each battery rack (or pack) to be managed, calculate a Status Of Charge (SOC) of the battery based on monitoring results. A plurality of RBMSs are connected to a BBMS (Bank BMS) 130, which is a BMS that monitors and controls the entire battery system as an upper controller of the plurality of RBMSs.

A pre-charge circuit and a main contactor are disposed at an output terminal of each battery rack, and the pre-charge circuit and the main contactor are disposed in parallel with each other. The pre-charge circuit may include a precharge contactor (PC) and a precharge resistor (PR) and perform a role as an initial charging circuit. The main contactor closes to connect each battery rack and the main DC/DC converter, thereby forming a charge/discharge circuit to perform a normal charging/discharging after the initial charging is completed.

The energy storage system according to embodiments of the present invention may include a main DC/DC converter 210 and an auxiliary DC/DC converter 220 as power converters. As shown in FIG. 5, the auxiliary DC/DC converter 220 may be connected to a plurality of switches and the main DC/DC converter 210.

The auxiliary DC/DC converter 220 may also be coupled to an energy storage device 300. The energy storage device 300 may be, for example, a high-output energy source such as a supercapacitor or other batteries. A supercapacitor is a large-capacity capacitor compared to a general capacitor, and has a fast response characteristic to instantaneous power demands. For that reason, a supercapacitor is used in the embodiments and it is possible to quickly respond to an instantaneously insufficient power in order to maintain the output of the main DC/DC converter 210.

The auxiliary DC/DC converter 220 normally operates in a standby mode and starts to operate at a moment of changeover of battery racks. In other words, the auxiliary DC/DC converter 220 may perform charging or discharging for insufficient power when the battery rack is being switched, in order to maintain a constant output of the main DC/DC converter.

In the embodiment of FIG. 5, the control may be performed by the PMS 500, which may determine and control how much power is insufficient and how much supplement power the auxiliary DC/DC converter 220 is responsible for, when the battery rack is switched over. The auxiliary DC/DC converter 220 may perform this auxiliary charge/discharge operation using the energy storage device 300.

The auxiliary DC/DC converter 220 is temporarily operated doing a task (e.g. charging) at a moment of switching of the battery racks. Then, during a normal operation of the battery rack after the task given at the moment of switching is completed, the operation (e.g. discharging) opposite to that at the moment of battery switching is performed. In other words, the auxiliary DC/DC converter performs a long-time discharging operation (in a case of performing an instantaneous charging operation during battery switching) or a long-time charging operation (in a case of instantaneous discharging operation during battery switching) in order to maintain the super-capacitor at a constant voltage when the task is completed. Here, the sum of energy in the entire period of mutual operations by the supercapacitor should be zero. In other words, the sum of energy during the instantaneous charging and the long-time discharging by the supercapacitor becomes 0. Similarly, the sum of energy during an instantaneous discharging and a long-time charging by the supercapacitor becomes zero.

In other words, when a task of instantaneous charging or instantaneous discharge is completed, a compensation operation (discharging or charging) for a long time is performed. Here, since the compensation operation is low-power discharging or low-power charging, the output amount of the main DC/DC converter 210 is hardly affected.

As shown in FIG. 5, the output of the main DC/DC converter 210 may be connected to a load 400 and a power management system (PMS) 500. That "the output of the main DC/DC converter 210 is maintained" in the present specification may mean that the output supplied from the main DC/DC converter 210 to the load 400 or the output supplied form the main DC/DC converter 210 to the battery rack 100 is kept constant.

The power management system 300 may be connected to the auxiliary DC/DC converter 220 to control operations of the auxiliary DC/DC converter 220.

The main DC/DC converter and the auxiliary DC/DC converter may be bi-directional converters. Examples of the DC/DC converter include a full-bridge converter, a half-bridge converter, and a flyback converter. The main DC/DC converter may include a controller, an input switching set, a primary coil, a secondary coil, an output switching set, and a capacitor.

In the embodiment described above, the main DC/DC converter and the auxiliary DC/DC converter are implemented as separate devices. Somehow, the main DC/DC converter and the auxiliary DC/DC converter may be dually included in one converter device 200, which in also included in the scope of the present invention.

FIG. 6 is a block diagram of an energy storage system according to another embodiment of the present invention.

The energy storage system shown in FIG. 6 is another embodiment of the present invention, and does not include a PMS as a component compared to the exemplary system shown in FIG. 5. Here, controlling the main DC/DC converter and the auxiliary DC/DC converter may be performed by an internal controller 211 included in the main DC/DC converter 210.

In this instance, the controller 211 included in the main DC/DC converter 210 may determine the output of the main DC/DC converter 210 according to a state of the battery monitored through the Bank BMS (BBMS) 130, and determine an output value of the auxiliary DC/DC converter 220 based on the output of the main DC/DC converter.

FIG. 7 is a diagram illustrating an operation sequence of each component in the energy storage system according to embodiments of the present invention.

In the energy storage system according to the present invention, each battery rack performs a pre-charge operation using a pre-charge circuit to gradually increase the output before operating in earnest. When the battery reaches a specific voltage through the pre-charge operation, the main switch is closed, and thereafter, a normal charging or discharging operation may be performed.

Referring to the embodiment of FIG. 7, battery rack #1 is the first operating battery rack. After the charging operation for battery rack #1 is completed, operation of battery rack #2 proceeds in order. Here, at the moment when a switching from battery rack #1 to battery rack #2 occurs, charging amount of battery rack #1 is gradually decreasing, but the output of the main DC/DC converter is maintained constant. This is due to an auxiliary charging operation of the auxiliary DC/DC converter. The auxiliary DC/DC converter supplies as much as the reduced charge amount 71 of battery rack #1 during switching.

Then, when the operation of battery rack #2 starts and operates normally, the auxiliary DC/DC converter performs discharging 72 over a long period of time with low power. Here, since the discharge power of the auxiliary DC/DC converter is very small, the effect on the output of the main DC/DC converter is insignificant. This discharged energy contributes to charging of battery rack #2 with a very small value. This process may be repeated up to battery rack #n sequentially according to a predetermined battery operation sequence.

Meanwhile, a charging operation is described as an example in FIG. 7, but the same may be applied to a discharging operation. During discharging, the auxiliary DC/DC converter may instantaneously discharge a large amount of power and then charge with low power over a long period of time using the supercapacitor.

FIG. 8 illustrates an exemplary operation when a charging operation is performed in an energy storage system according to embodiments of the present invention.

The flowchart of FIG. 8 shows an operation during charging of a battery rack, and should be understood that a discharging operation may also proceed in a similar order. In this embodiment, an operation when charging for battery rack #1 occurs first and a switching to battery rack #2 occurs in order will be described.

Charging for battery rack #1 may include an initial charging process (S810) performed with precharge contactor 1 (PC 1) being closed, and a normal charging process (S811) performed with precharge contactor 1 being open and main contactor 1 being closed. Here, battery rack #1 performs a charging operation in connection with the main DC/DC converter. The charging process for battery rack #1 continues until the SOC of battery rack #1 reaches a specific threshold (99% in FIG. 8) (S812). Here, the SOC threshold may be described as a reference value at which the output of the battery rack in charging or discharging operation starts to decrease for battery switching, and may be set to a different value according to each system.

Back to FIG. 8, when the SOC of battery rack #1 reaches, for example, 99%, a charging amount of battery rack #1 gradually decreases. Here, a charging amount of the auxiliary DC/DC converter according to the present invention gradually increases by an amount corresponding to the decreasing charge amount of battery rack #1. Accordingly, the charge amount of the entire DC/DC converters may be maintained constant (S813). This is an advantage provided by the present invention compared to an existing system.

Thereafter, at a point when charging of battery rack #1 is completed and the charging operation is stopped (S814), the auxiliary DC/DC converter is performing a full charging and the charge amount of the DC/DC converters is constantly being maintained.

Then, a switching to the next battery rack (battery rack #2 in FIG. 8) occurs, and a charging process for the next battery rack may be performed. In a state in which precharge contactor 2 (PC 2) is closed, an initial charging of battery rack #2 is performed (S820). Here, since the switching to battery #2 has occurred, the charge amount of the auxiliary DC/DC converter is reduced. At this moment, since the main DC/DC converter operates again, the output of the main DC/DC converter may be kept constant.

Thereafter, in a state in which precharge contactor 2 is opened and the main contactor 2 is closed, a normal charging process for battery rack 2 may be performed (S821). Here, the auxiliary DC/DC converter performs a low-power discharging operation over a long period of time as a compensation operation for the charging operation. Since the discharge power of the auxiliary DC/DC converter is low power, the output of the entire DC/DC converters may be kept constant even in this case.

FIG. 9 is a flowchart of a method of operating an energy storage system according to embodiments of the present invention.

The method of operating an energy storage system according to embodiments of the present invention relates to a method of operating an energy storage system comprising a plurality of battery racks, a first DC/DC converter and a second DC/DC converter selectively connected to any one of the plurality of battery racks. Here, the first DC/DC converter may be a main DC/DC converter, and the second DC/DC converter may be an auxiliary DC/DC converter.

According to the operating method of the energy storage system according to embodiments of the present invention, by connecting a first battery rack and the first DC/DC converter (S910), a charging or discharging operation for the first battery rack may be performed (S920).

When a state of charge (SOC) of the first battery rack reaches a threshold set in relation to a switching between battery racks (Yes of S930), the output of the first battery rack may be reduced (S940). Here, in order to compensate for a decrease in the output of the first battery rack, the second DC/DC converter may perform an operation for maintaining the output of the first DC/DC converter (S950). For this, the second DC/DC converter may be connected to an energy storage device to perform an output maintenance operation for the first DC/DC converter.

Thereafter, when the charging or discharging operation for the first battery rack is completed, a second battery rack may be connected to the first DC/DC converter to perform the next charging or discharging operation. After the switching from the first battery rack to the second battery rack is completed (S960), the second DC/DC converter may perform a compensating operation for the output maintaining operation for the first DC/DC converter (S970).

Here, when the output maintenance operation for the first DC/DC converter is discharging, the compensating operation may be a low-power charging operation to the energy storage device for a long time. Furthermore, when the output maintaining operation for the first DC/DC converter is charging, the compensating operation may be a low-power discharging operation to the energy storage device for a long time.

The operations of the method according to the embodiments of the present invention may be implemented as a computer-readable program or code on a computer-readable recording medium. The computer-readable recording medium includes all types of recording devices in which data readable by a computer system is stored. In addition, the computer-readable recording medium may be distributed in a network-connected computer system to store and execute computer-readable programs or codes in a distributed manner.

In addition, the computer-readable recording medium may include a hardware device, such as a ROM, a RAM, and a flash memory, specially configured to store and execute program instructions. The program instructions may include not only machine language codes such as those generated by a compiler, but also high-level language codes that can be executed by a computer by using an interpreter or the like.

Although some aspects of the invention have been described in the context of the apparatus, it may also represent a description according to a corresponding method, wherein a block or apparatus corresponds to a method step or feature of a method step. Similarly, aspects described in the context of a method may also represent a feature of a corresponding block or item or a corresponding apparatus. Some or all of the method steps may be performed by (or using) a hardware device, such as, for example, a microprocessor, a programmable computer, or an electronic circuit. In some embodiments, one or more of the most important method steps may be performed by such an apparatus.

In the forgoing, the present invention has been described with reference to the exemplary embodiment of the present invention, but those skilled in the art may appreciate that the present invention may be variously corrected and changed within the range without departing from the spirit and the area of the present invention described in the appending claims.

The invention claimed is:

1. An apparatus for controlling charge and discharge power in an energy storage system including a plurality of battery racks, the apparatus comprising:

a first direct current/direct current (DC/DC) converter selectively connected to one of the plurality of battery racks to perform power conversion;

a second DC/DC converter connected to the first DC/DC converter; and a controller configured to control the second DC/DC converter to perform an operation of maintaining an output of the first DC/DC converter while a switching between battery racks by the first DC/DC converter is being performed, wherein the controller is further configured to determine an output value of the second DC/DC converter based on the output of the first DC/DC converter.

2. The apparatus of claim 1, wherein the controller is further configured to control the second DC/DC converter to perform a compensating operation for the operation of maintaining the output of the first DC/DC converter after the switching between battery racks by the first DC/DC converter is completed.

3. The apparatus of claim 1, further comprising an energy storage device connected to the second DC/DC converter.

4. The apparatus of claim 3, wherein the operation of maintaining the output of the first DC/DC converter is a discharge operation or a charge operation.

5. The apparatus of claim 4, wherein, upon the operation of maintaining the output of the first DC/DC converter being discharging, the controller is further configured to perform a compensating operation being a low power charging operation to the energy storage device, the compensating operation being the operation of maintaining the output of the first DC/DC converter after the switching between battery racks by the first DC/DC converter is completed.

6. The apparatus of claim 4, wherein, upon the operation of maintaining the output of the first DC/DC converter being charging, the controller is further configured to perform a compensating operation being a low power discharging operation to the energy storage device, the compensating operation being the operation of maintaining the output of the first DC/DC converter after the switching between battery racks by the first DC/DC converter is completed.

7. The apparatus of claim 1, wherein the controller is a power management system (PMS) or an internal controller included in the first DC/DC converter.

8. The apparatus of claim 3, wherein the energy storage device includes at least one of a capacitor, a super capacitor, and a battery.

9. An energy storage system comprising:

a plurality of battery racks;

a plurality of switches individually connected to each of the plurality of battery racks;

a first direct current/direct current (DC/DC) converter selectively connected to one of the plurality of battery racks through the plurality of switches;

a second DC/DC converter connected to the plurality of switches and the first DC/DC converter; and a controller configured to control the second DC/DC converter to perform an operation of maintaining an output of the first DC/DC converter while a switching between battery racks by the first DC/DC converter is being performed, wherein the controller is further configured to determine an output value of the second DC/DC converter based on the output of the first DC/DC converter.

10. The energy storage system of claim 9, wherein the controller is further configured to control the second DC/DC converter to perform a compensating operation for the operation of maintaining the output of the first DC/DC converter after the switching between battery racks by the first DC/DC converter is completed.

11. The energy storage system of claim 10, further comprising an energy storage device connected to the second DC/DC converter.

12. The energy storage system of claim 11, wherein, upon the operation of maintaining the output of the first DC/DC converter being discharging, the compensating operation is a low power charging operation to the energy storage device.

13. The energy storage system of claim 11, upon the operation of maintaining the output of the first DC/DC converter being charging, the compensating operation is a low power discharging operation to the energy storage device.

14. A method of operating an energy storage system including a plurality of battery racks, a first direct current/direct current (DC/DC) converter selectively connected to one of the plurality of battery racks, and a second DC/DC converter, the method comprising:

connecting a first battery rack among the plurality of battery racks and the first DC/DC converter to perform a charge or discharge operation for the first battery rack;

upon a state of charge of the first battery rack reaching a threshold which is set in relation to switching between battery racks, reducing an output of the first battery rack; and performing, by the second DC/DC converter, an operation to maintain an output of the first DC/DC converter, wherein the operation to maintain the output of the first DC/DC converter includes determining an output value of the second DC/DC converter based on the output of the first DC/DC converter.

15. The method of claim 14, further comprising, upon the charging or discharging operation for the first battery rack is completed, connecting the first DC/DC converter to a second battery rack to perform the next charging or discharging operation.

16. The method of claim 14, wherein the second DC/DC converter is connected to a separate energy storage device to perform an operation of maintaining the output of the first DC/DC converter.

17. The method of claim 16, further comprising performing, by the second DC/DC converter, a compensating operation for the operation of maintaining the output of the first DC/DC converter, after the switching between battery racks by the first DC/DC converter is completed.

18. The method of claim 17, wherein, upon the operation of maintaining the output of the first DC/DC converter being discharging, the compensating operation is a low power charging operation to the energy storage device.

19. The method of claim 17, wherein, upon the operation of maintaining the output of the first DC/DC converter being charging, the compensating operation is a low power discharging operation to the energy storage device.

20. The method of claim 16, wherein the energy storage device includes at least one of a capacitor, a super capacitor, and a battery.

* * * * *